United States Patent Office 2,833,972
Patented May 6, 1958

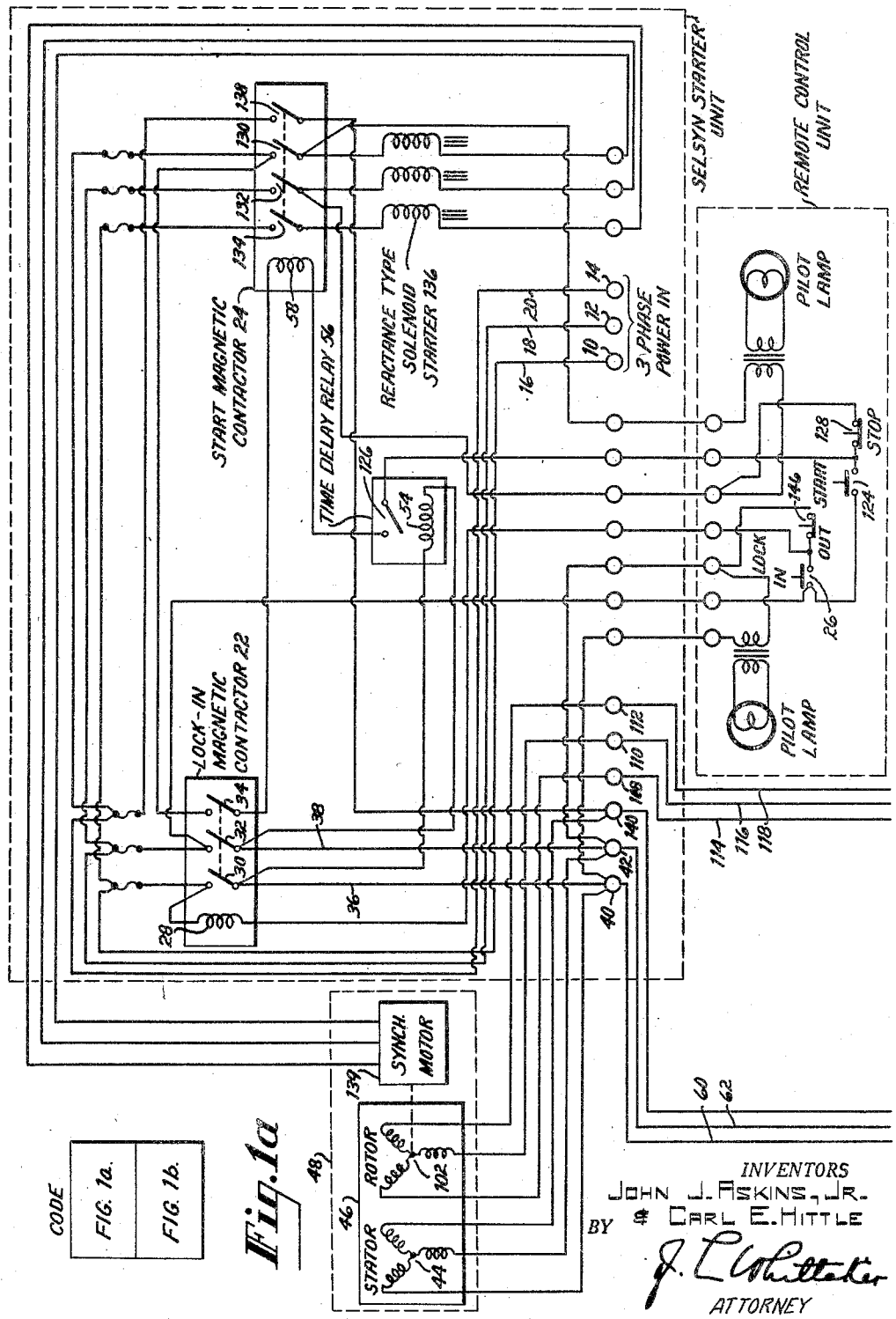

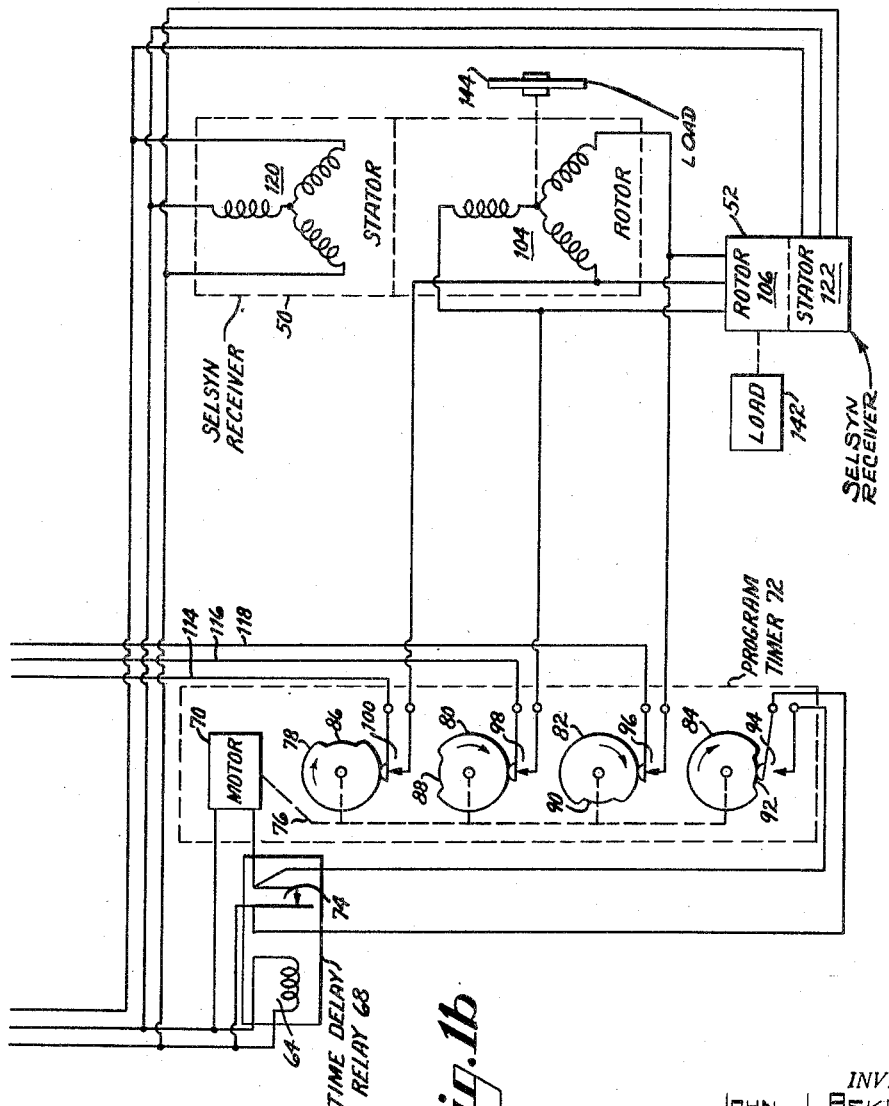

2,833,972

POWER TYPE SELSYN MOTOR CONTROL SYSTEM

Carl E. Hittle, North Hollywood, and John J. Askins, Jr., Burbank, Calif., assignors to Radio Corporation of America, a corporation of Delaware Application November 1, 1955, Serial No. 544,264

8 Claims. (Cl. 318—44)

The present invention relates to an interlock motor system of the type including a distributor interlock motor and one or more load interlock motors, and to an improved arrangement and method for locking the rotors of the load interlock motors in phase correspondence with the rotor of the distributor interlock motor.

A so-called selsyn interlock motor system such as used in motion picture production consists of a unit commonly known as a distributor, one or more load interlock motors, and a starting control unit. The system is ordinarily designed for operation from a polyphase power source such as a three-phase source. The distributor consists of a large size interlock motor usually of from 1½ to 2 horsepower rating with its rotor shaft mechanically coupled at a 1:1 ratio to the rotor shaft of a synchronous motor. The latter is usually of from ⅓ to ½ horsepower rating. The load interlock motors are used to drive motion picture cameras, and/or sound film recorders, and/or sound film reproducers. These motors may be from 1/20 horsepower to ¼ horsepower rating, usually depending upon the mechanical load of the particular equipment to be driven. The interlock motors in the motor system are usually of the four-pole type and have a normal operating speed of 1200 R. P. M. when the frequency of the power source is 60 cycles per second. The starting control unit ordinarily consists of a system of two electromagnetically operated contactors and a set of push button type switches for control of the contactors.

The stators of all interlock motors, including the one of the master distributor and those connected to the loads, are all electrically interconnected in parallel and, in operation, are connected to the three-phase power source through the control unit. The rotors of all interlock motors of the system are all interconnected, in parallel, but are not electrically connected to the power source.

In order to obtain the benefit of the interlock feature of the system, power is applied to the motors in the following manner: Line voltage (single-phase) is first applied across two legs of the stators of all of the interlock motors, which normally causes the motors to rotate into alignment or phase correspondence position. After an interval of 2 to 4 seconds, a period sufficient to permit the motors to come to rest after having rotated into phase correspondence, line voltage is also applied to the third leg of all of the stators. At the same time three-phase power is applied to the synchronous motor of the distributor unit, thus causing all interlock motors in the system to come up to normal operating speed together and in phase.

It sometimes happens that at the time single-phase power is applied to all stators, a load interlock motor rotor is in an initial rotational position displaced approximately 90 degrees (mechanical) from its true phase correspondence position (relative to the distributor interlock motor rotor), and the distributor interlock motor rotor is in a given one of 24 predetermined rotational positions (15 degree intervals) relative to its stator. In such case, a sufficient amount of voltage unbalance may be developed between the interlock motor rotor and the distributor interlock motor rotor to produce a current flow in the circuits of these motors which is several times the normal load current flow of the load interlock motor. This locks the load interlock motor rotor in a false pole position, displaced some 90 degrees from its true phase correspondence pole position. If the system remains with single-phase voltage only on the stators of the interlock motors for an extended period of time, a load interlock motor which is locked in a false pole position will overheat and may even burn out. In this connection, it might be mentioned that in motion picture studio practice interlock motor systems may remain on single-phase "lock-up" for a period of a half hour or more—a period more than sufficient to cause motor damage to an interlock motor locked in a false position and drawing excessive current. If, on the other hand, three-phase power for driving the motors is applied before the motor which is locked in a false phase position becomes overheated, that motor will start up and run at approximately induction motor speed (1725 R. P. M.) instead of its normal speed of 1200 R. P. M. This causes the equipment driven by the motor to run faster than standard speed, resulting in an unsatisfactory recording and/or reproduction.

It is an object of the present invention to provide an improved system for locking the rotors of all motors in an interlock motor system in true phase correspondence.

Another object is to provide an improved system for preventing damage to motors of an interlock multi-motor system.

In the interlock motor control system of this invention, the rotors of all motors are interconnected in parallel and the stators of all motors are interconnected in parallel. Single-phase power is first applied to the stators of all interlock motors. This causes a predetermined flux distribution to occur at the poles of the respective rotors of the system. The flux distribution pattern is momentarily changed, whereby the rotors of the load motors momentarily move to new positions slightly angularly displaced from their original positions. One or more different changes in the flux distribution pattern causes a load interlock motor rotor which may initially be locked in false phase position to move into true phase correspondence with the distributor interlock motor rotor.

In a preferred form of the invention, the flux distribution pattern of the rotors is changed in the following manner: First the lead between one leg of the distributor interlock motor rotor and the corresponding leg of the remaining rotors is broken and then reclosed; next the lead between the second leg of the rotor of the distributor interlock motor rotor and corresponding legs of the remaining rotors is broken and reclosed; and finally the lead between the third leg of the distributor interlock motor rotor is broken and then reclosed. This procedure causes load motor rotors to be moved sufficient amounts to become aligned in phase with the rotor of the distributor interlock motor rotor. Now, three-phase power may be applied to the stators of all interlock motors and, at the same time, the synchronous motor driving the rotor of the distributor may be energized. When the interlock motor system is to be slowed down and stopped, the driving motor is disconnected, and the three-phase power to all interlock motors is replaced with single-phase power. This permits all motors to coast to a standstill position while remaining locked in phase correspondence.

The invention will be described in greater detail by reference to the following description taken in connection with accompanying drawing in which:

Figures 1a and 1b, together, comprise a schematic circuit diagram of a preferred form of the present invention.

Referring to the drawing, three-phase power is applied to terminals 10, 12 and 14. This power is carried over conductors 16, 18 and 20 to lock-in magnetic contactor 22 and start magnetic contactor 24. The poles of contactor 22 and contactor 24 are open.

In order to start the system, lock-in switch 26 is momentarily depressed whereby the circuit of coil 28 of contactor 22 is completed. When switch 26 is released, the coil is maintained energized through normally closed lock-out switch 146, relay 28 being picked up. Poles 30, 32 and 34 of the contactor now close and single-phase power is applied via leads 36 and 38, and terminals 40 and 42 to the stator 44 of the interlock motor 46 of distributor 48 and to the corresponding stators of the load interlock motors. Two such load interlock motors 50 and 52 are shown in the drawing, however, it is to be understood that any number, greater or less than two such motors, may be employed.

When lock-in switch 26 is depressed, coil 54 of time delay relay 56 is also energized. This relay is one of the type which closes its contacts after a predetermined interval of time. In the present instance the time is approximately 20 seconds. The reason for the 20 second delay will be given later.

When the lock-in switch is depressed, power is also applied from terminals 40 and 42 over leads 60 and 62 to both the coil 64 of time delay relay 68 and the motor 70 of program timer 72. Contacts 74 of time delay relay 68 are normally closed. The relay is of the type which opens its contacts after a predetermined interval of time. In the present instance the interval may be about a second or so.

The shaft 76 of motor 70 is mechanically coupled to cams 78, 80, 82 and 84. Each cam is formed with a cutout portion along a small portion of the periphery thereof and the four cut-out portions 86, 88, 90 and 92 are spaced from one another at 90 degree intervals. The cams are so arranged that contacts 94 associated with cam 84 are normally open and contacts 96, 98 and 100 respectively associated with cams 82, 80 and 78 are normally closed.

The rotor 102 of the interlock motor of the distributor is normally connected to the rotors 104 and 106 of the load interlock motors via terminals 108, 110 and 112 and leads 114, 116 and 118, respectively. Contacts 100, 98 and 96 are in series with leads 114, 116 and 118, respectively.

In operation, when lock-in switch 26 is depressed, single-phase power is applied to stator 44 of the distributor interlock motor and stators 120 and 122 of the load interlock motors. Single-phase power is also applied to coil 64 of time delay relay 68 and motor 70 of program timer 72. Motor 70 begins to turn and, in about a second, cam 84 is in a position such that relay holding contacts 94 are placed across contacts 74 of time delay relay 68. Shortly thereafter contacts 74 open, but the circuit to motor 70 remains closed through contacts 94. In a few seconds cam 78 has moved to a position such that contacts 100 open. This breaks the connection between one of the legs of the distributor interlock motor rotor and the corresponding legs of the load interlock motor rotors. At the time the connection is broken, the point of maximum flux distribution for the poles of the load interlock motor rotors is shifted slightly, thus causing the rotors to rotate slightly to realign their poles with respect to the poles established in the stator. In a similar manner, shortly after contacts 100 are reclosed, cam 80 opens contacts 98, whereby lead 116 extending between interlock motor rotors is broken. Next contacts 98 are reclosed and contacts 96 which are in series with lead 118 are opened. By the time the three rotor interconnections have been broken and remade, the load interlock motor rotor positions have been disturbed sufficiently to cause them to assume their true phase correspondence position. As a matter of fact, in most instances it will be necessary to break only one or two of the connections to place all the load interlock motor rotors in true phase correspondence with the distributor rotor, however, in a practical system the three connections were broken and then remade to provide a safety factor. The time required for any one connection to remain broken need be only about 0.3 to 0.5 second. However, here too the cam cutouts are made sufficiently long to permit the connections to remain broken for a somewhat longer interval.

In a typical system according to the present invention the small load motors were four-pole motors. Their normal full load current was approximately 350 milliamperes. During false lock-up the motors drew from 700 to 1000 milliamperes. After "jogging" the rotors by successively breaking the connections to the rotors of the load motors, as described above, the rotor current dropped to its normal initial current (during single-phase interlock) of from 30 to 52 milliamperes.

After a period of 2 to 4 seconds (depending on the speed to which motor 70 is adjusted), the four cams return to their original positions, contact 94 opens, and motor 70 stops. It will be remembered that time delay relay 68 is energized at this time whereby contacts 74 are open.

After the rotors of the various interlock motors are properly aligned, the system may be started in its normal mode of operation. This is accomplished by momentarily depressing start switch 124. This completes the circuit to coil 58 of start magnetic contactor 24. It will be remembered, in this connection, that by the time the rotor alignment procedure is completed, time delay relay 56 will have its contacts 126 closed. The time delay introduced by relay 56 may be adjusted from approximately 5 to 20 seconds. Although this interval is somewhat longer than is actually required (since the load interlock motors become aligned in less than 5 seconds), the additional time delay is inserted as a further margin of safety. The start magnetic contactor coil circuit is maintained closed through normally closed stop switch 128 and closed contactor pole 130. Three-phase power is now applied from poles 130, 132 and 134 of the contactor and reactive type solenoid starter 136 to the synchronous driving motor 139 of distributor 48. The third phase of power is also applied from contactor pole 138 and terminal 140 to the distributor interlock motor stator and all other interlock motor stators. Now all interlock motors operate in synchronism and drive their loads in synchronism.

For the purpose of illustration, film sprocket 144 which may be used to drive a sound track film or the like is shown as a load for one of the load interlock motors, and block 142 which may be another film sprocket as the load for another of the load motors.

Momentary depression of stop switch 128 causes magnetic contactor 24 to be de-energized, which removes three-phase power from the synchronous driving motor 139 and leaves only single-phase power connected to the stators of all interlock motors. This permits all motors to coast to a standstill position while remaining in phase correspondence position rotationally. The motors of the system may be restarted merely by momentarily closing start switch 124.

Momentary depression of lock-out switch 146 de-energizes magnetic contactors 22 and 24 and time delay relay 56, thus removing all voltage from all motors. To restart the motors, the starting sequence must be repeated, starting with the closing of lock-in switch 26.

What is claimed is:

1. In an interlock motor system of the type including a polyphase distributor interlock motor having a rotor and stator, and at least one polyphase load interlock motor having a rotor and stator, said rotors being connected in parallel, and said stators being connected in parallel, an arrangement for locking the rotor of said load motor to the rotor of said distributor motor comprising, means for applying single-phase power to said stators; and means for changing the flux distribution pattern of the rotor of said load motor so as to rotate said rotor through a relatively small angle.

2. In an interlock motor system of the type including a polyphase distributor interlock motor having a rotor and stator, and at least one polyphase load interlock motor having a rotor and stator, said rotors being connected in parallel, and said stators being connected in parallel, an arrangement for locking the rotor of said load motor to the rotor of said distributor motor comprising, means for applying single-phase power to said stators; and means for successively changing the flux distribution pattern of the rotor of said load motor so as to successively rotate said rotor through relatively small angles.

3. In an interlock motor system of the type including a polyphase distributor interlock motor having a stator and a rotor with a given plurality of legs, and at least one polyphase load interlock motor having a stator and a rotor with said given plurality of legs, said two stators being connected in parallel and corresponding legs of said rotor being connected in parallel, an arrangement for locking the rotor of said load motor to the rotor of said distributor motor comprising, means for applying single-phase power to said two stators; and means for changing the flux distributon pattern of the rotor of said load motor including means for opening and then closing the circuit between at least one leg of one rotor and a corresponding leg of the other rotor.

4. In an interlock motor system of the type including a polyphase distributor interlock motor having a stator and a rotor with a given plurality of legs, and at least one polyphase load interlock motor having a stator and a rotor with said given plurality of legs, said two stators being connected in parallel and corresponding legs of said rotor being connected in parallel, an arrangement for locking the rotor of said load motor to the rotor of said distributor motor comprising, means for applying single-phase power to said two stators; and means for opening and then closing the connection between one leg of one rotor and a corresponding leg of the other rotor and for successively repeating said opening and closing operation for the connections between the remaining legs of the two rotors.

5. In an interlock motor system of the type including a three-phase distributor interlock motor having a stator and rotor and a plurality of three-phase load interlock motors, each having a stator and rotor, all of said stators of all interlock motors being connected in parallel and all of said rotors of all interlock motors being connected in parallel, an arrangement for locking all of said rotors in phase correspondence comprising, means for applying single-phase power to all of said stators; and means for changing the flux distribution pattern of the rotors of all of said load motors for a brief interval of time while maintaining the rotor of the distributor interlock motor in fixed position so as to rotate the rotors of the load motors through a relatively small angle.

6. In an interlock motor system of the type including a polyphase distributor interlock motor having a rotor and stator with a given plurality of legs, and at least one polyphase load interlock motor having a stator and a rotor with said given plurality of legs, said two stators being connected in parallel and corresponding legs of said rotor being connected in parallel, a method for locking the rotor of said load motor in phase correspondence position with the rotor of said distributor motor comprising the steps of applying power to said stators; and changing the flux distribution pattern of the rotor of the load motor while maintaining the rotor of the distributor motor in fixed position so as to rotate said rotor of the load motor through a relatively small angle.

7. In an interlock motor system of the type including a polyphase distributor interlock motor having a rotor and stator with a given plurality of legs, and at least one polyphase load interlock motor having a stator and a rotor with said given plurality of legs, said two stators being connected in parallel and corresponding legs of said rotor being connected in parallel, a method for locking the rotor of said load motor in phase correspondence position with the rotor of said distributor motor comprising the steps of applying power to said stators; and successively changing the flux distribution pattern of the rotor of the load motor while maintaining the rotor of the distributor motor in fixed position so as to rotate the rotor of the load motor through successive angles.

8. In an interlock motor system of the type including a polyphase distributor interlock motor having a rotor and stator with a given plurality of legs, and at least one polyphase load interlock motor having a stator and a rotor with said given plurality of legs, said two stators being connected in parallel and corresponding legs of said rotor being connected in parallel, a method for locking the rotor of said load motor in phase correspondence position with the rotor of said distributor motor comprising the steps of applying power to said stators; and, during the application of said power, and while all motors are in stopped position, changing the flux distribution pattern of the rotor of the load motor for a brief interval of time.

References Cited in the file of this patent

"Electric Motors in Industry," pp. 170–171, Fig. 6.12. Shoults, Rife and Johnson, John Wiley, New York, 1942.